US006529525B1

United States Patent
Pecen et al.

(10) Patent No.: US 6,529,525 B1
(45) Date of Patent: *Mar. 4, 2003

(54) METHOD FOR SUPPORTING ACKNOWLEDGED TRANSPORT LAYER PROTOCOLS IN GPRS/EDGE HOST APPLICATION

(75) Inventors: Mark E. Pecen, Rolling Meadows, IL (US); Marcia Otting, Mundelein, IL (US); Donald Dorsey, Vernon Hills, IL (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/574,545

(22) Filed: May 19, 2000

(51) Int. Cl.[7] .............................. H04J 3/16; H04J 3/24
(52) U.S. Cl. ........................ 370/469; 370/349; 370/471
(58) Field of Search ................................. 370/394, 231, 370/474, 473, 472, 470, 329, 330, 336, 341, 337, 345, 349, 389, 469; 714/748, 749, 750; 455/445, 450, 509, 337

(56) References Cited

U.S. PATENT DOCUMENTS

| 5,063,562 | A | * | 11/1991 | Barzilai et al. | 370/231 |
|---|---|---|---|---|---|
| 6,038,606 | A | * | 3/2000 | Brooks et al. | 370/229 |
| 6,058,106 | A | * | 5/2000 | Cudak et al. | 370/313 |
| 6,108,522 | A | * | 8/2000 | Blanke | 455/39 |
| 6,118,775 | A | * | 9/2000 | Kari et al. | 370/349 |
| 6,151,696 | A | * | 11/2000 | Miller et al. | 714/748 |
| 6,182,246 | B1 | * | 1/2001 | Gregory et al. | 714/38 |
| 6,208,620 | B1 | * | 3/2001 | Sen et al. | 370/231 |
| 6,230,296 | B1 | * | 5/2001 | Hanko et al. | 714/748 |
| 6,259,724 | B1 | * | 7/2001 | Esmailzadeh | 455/337 |
| 6,272,117 | B1 | * | 8/2001 | Choi et al. | 370/330 |
| 6,272,148 | B1 | * | 8/2001 | Takagi et al. | 370/469 |
| 6,282,182 | B1 | * | 8/2001 | Pecen et al. | 370/336 |

OTHER PUBLICATIONS

GSM 04.60, "Digital cellular telecommunications system (Phase 2+); General Packet Radio Service (GPRS); Mobile Station (MS)—Base Station System (BSS) interface; Radio Link Control/Medium Access Control (RLC/MAC) protocol," (European Telecommunications Standards Institute (ETSI); European Standard (Telecommunications series)).

* cited by examiner

*Primary Examiner*—Kwang Bin Yao
*Assistant Examiner*—Hanh Nguyen
(74) *Attorney, Agent, or Firm*—Randall S. Vaas

(57) ABSTRACT

A method for sending acknowledged transport data between a mobile station (202) and a base station system (208) in a GPRS system (200) in which a protocol control unit (214) counts the number of data blocks in an acknowledgement message sent by the mobile station in response to a data packet transmission. A heuristic is then defined, based on the number of data blocks counted, and the number of corresponding data blocks corresponding to a subsequent data packet transmission is compared with the heuristic to determine that a virtual acknowledgement channel is being requested when the number of corresponding data blocks in the subsequent packet data transmission is less than the heuristic.

26 Claims, 8 Drawing Sheets

METHOD FOR SUPPORTING ACKNOWLEDGED TRANSPORT LAYER PROTOCOLS IN GPRS/EDGE HOST APPLICATION

FIELD OF THE INVENTION

The present invention relates generally to end-to-end transmission of packet based data, and in particular, the present invention relates to a method for implementing an acknowledgement cycle in a packet-switched transport layer.

BACKGROUND OF THE INVENTION

Global System for Mobile Communications (GSM) General Packet Radio Service (GPRS) is intended to allow a service subscriber the ability to send and receive data in an end-to-end packet transfer mode without utilizing network resources in the circuit-switched mode. GPRS permits efficient use of radio and network resources when data transmission characteristics are i) packet based, ii) intermittent and non-periodic, iii) possibly frequent, with small transfers of data, e.g. less than 500 octets, or iv) possibly infrequent, with large transfers of data, e.g. more than several hundred kilobytes. User applications may include Internet browsers, electronic mail and so on.

When GPRS carries commonly-used, reliable stream-oriented transmission control protocol (TCP) over internet protocol (IP), it is necessary that data flows in both directions between a mobile station and a base station. Current GPRS related methods for implementing a packet-switched radio layer in a stream-oriented data transmission from a remote host on a network to the mobile station generally include a downlink setup period and a data transfer period in one direction, and an uplink setup period and an acknowledge data transfer period in the opposite direction.

FIG. 1 is a schematic diagram of a complete packet data transfer in terms of the relative time required for implementing a GPRS packet-switched radio layer. As illustrated in FIG. 1, a data transfer phase 102 of a complete data transfer 100 is of longer duration than a setup phase 104 and a teardown phase 106. The complete packet data transfer 100 is generally referred to as a temporary block flow (TBF), and is the basic atomic unit of a packet data abstraction. It is understood that the amount of time for the setup of a temporary block flow for GPRS varies, and is dependent on channel conditions, radio resource availability, network congestion and so on. This is in contrast to a mechanism that GPRS utilizes to perform the teardown phase, which is basically a form of one-way countdown signaling piggy-backed in the data blocks from the sender.

Assuming a fixed amount of overhead for the period required to perform the setup phase, the amount of real overhead required varies depending on the size of the data payload, and therefore the length of time required to transmit this payload. The percentage of temporary block flow setup overhead is inversely proportional to the size of the payload, so that, for example, as the size of the payload increases, the percentage of temporary block flow setup overhead decreases.

FIG. 2 is a data flow diagram of a stream-oriented data transmission from a remote host on a network to a mobile station. As illustrated in FIG. 2, stream-oriented A data transmitted from a remote host is first divided into transmission control protocol (TCP) packets and given an internet protocol (IP) address at transport and network layers 120, and sent to a base station protocol control unit 122 as a TCP/IP packet 124. Assuming the mobile station corresponding to the address is camped on the network in packet idle mode, a temporary block flow associated with a downlink setup period 126 is initiated by protocol control unit 122, so that downlink setup period 126 ends once the associated temporary block flow is ready. The time required for downlink setup period 126 in known GPRS systems can take between 849 ms and 2643 ms.

Once downlink setup period 126 is completed, a temporary block flow containing radio link control blocks is sent from protocol control unit 122 to a GPRS/EDGE subsystem 128 during a data transmission period 130. The time required for data transmission period 130 in known GPRS systems is approximately 618 ms when a CS-1 coding scheme is used, and approximately 420 ms when a CS-2 coding scheme is used.

GPRS/EDGE subsystem 128 sends all of the data blocks corresponding to the temporary block flow in a single data packet 132 to transport and networks layers 134, which responds to receipt of single data packet 132 by issuing a transmission control protocol acknowledge message 136. A temporary block flow associated with a uplink setup period 138 cannot be initiated until a radio link control timer of protocol control unit 122 has expired, corresponding to timer expiration period 140. The temporary block flow associated with uplink setup period 138 is initiated by GPRS/EDGE subsystem 128, so that uplink setup period 138 ends once the associated temporary block flow is ready. The time required for initial uplink setup period 138 in known GPRS systems can take between 320 ms and 480 ms.

Once uplink setup period 138 is completed, a temporary block flow containing radio link control blocks is sent from GPRS/EDGE subsystem 128 to protocol control unit 122 during a data transmission period 142, and protocol control unit 122 sends all of the data blocks corresponding to the temporary block flow in a single data packet 144 to transport and networks layers 120. Once single data packet 144 is received, a next TCP/IP packet 146 is sent, and the process is repeated. The time required for data transmission period 142 in known GPRS systems is approximately 60 ms when a CS-1 coding scheme is used, and approximately 37 ms when a CS-2 coding scheme is used.

As can be seen in FIG. 2, a total period expended for the transmission of a single TCP/IP user data packet is equal to the sum of downlink setup period 126, data transmission period 130, timer expiration period 140, uplink setup period 138 and data transmission period 142. The amount of time associated with uplink setup period 138 (320–480 ms) is much greater than data transmission period 142 associated with transmission control protocol acknowledge message 136 (60 ms in a CS-1 coding scheme and 37 ms in a CS-2 coding scheme), and since it is necessary that uplink set period 138 be repeated for each TCP/IP user data packet, a significant portion of time is expended during uplink setup period 138 relative to the associated transmission control protocol acknowledge message 136. As a result, an artificially long round trip transit time is required for transmission control protocol acknowledge message 136, corrupting GPRS performance when an acknowledged transport layer protocol is used.

Accordingly, what is needed is a method for reducing repeated setup times on the acknowledgement cycle and on the time required for transmission of a single transport layer temporary block flow.

BRIEF DESCRIPTION OF THE DRAWINGS

The features of the present invention which are believed to be novel are set forth with particularity in the appended claims. The invention, together with further objects and advantages thereof, may best be understood by making reference to the following description, taken in conjunction with the accompanying drawings, in the several figures of which like reference numerals identify like elements, and wherein:

DETAILED DESCRIPTION OF THE PREFERRED EMBODIMENT

The present invention relates to a virtual acknowledgement channel (VAC) that is created to reduce the amount of unusable information transmitted in the form of setup sequences for short, periodic packet transfers. In order to eliminate repeated setup times on the acknowledgement cycle and on the total time required for the transmission of a single transport layer temporary block flow, the present invention uses an acknowledgement channel in which repeated temporary block flow setups for transport layer acknowledgements are eliminated. In this way, according to the present invention, by reducing the amount of useless information exchanged between the sender and receiver, the same amount of data is transmitted over a shorter period of time.

The acknowledgement channel of the present invention is implemented in GSM GPRS and EDGE by virtual means, i.e. by effectively enabling the network to maintain a temporary block flow, once started in the opposite direction, active without additional signaling between a mobile station and a network. The virtual acknowledgement channel of the present invention is under the control of the network at all times as to its allocated radio resources and is defined so as to have a minimum impact on GSM specifications, and to be reverse compatible with existing GPRS mobile stations.

Figure 1:
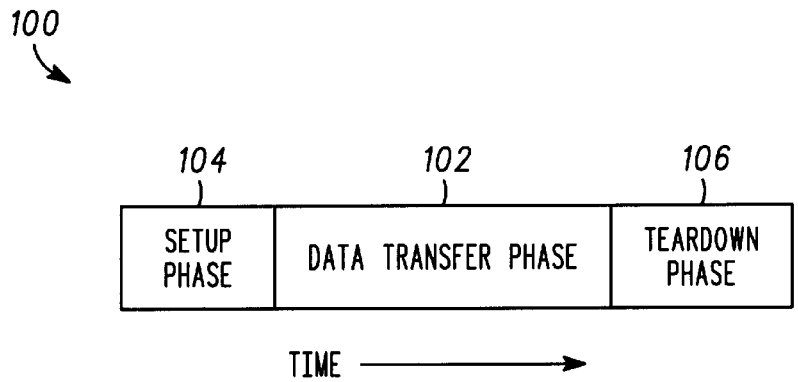
FIG. 1 is a schematic diagram of a complete packet data transfer in terms of the relative time required for implementing a GPRS packet-switched radio layer.
Figure 2:
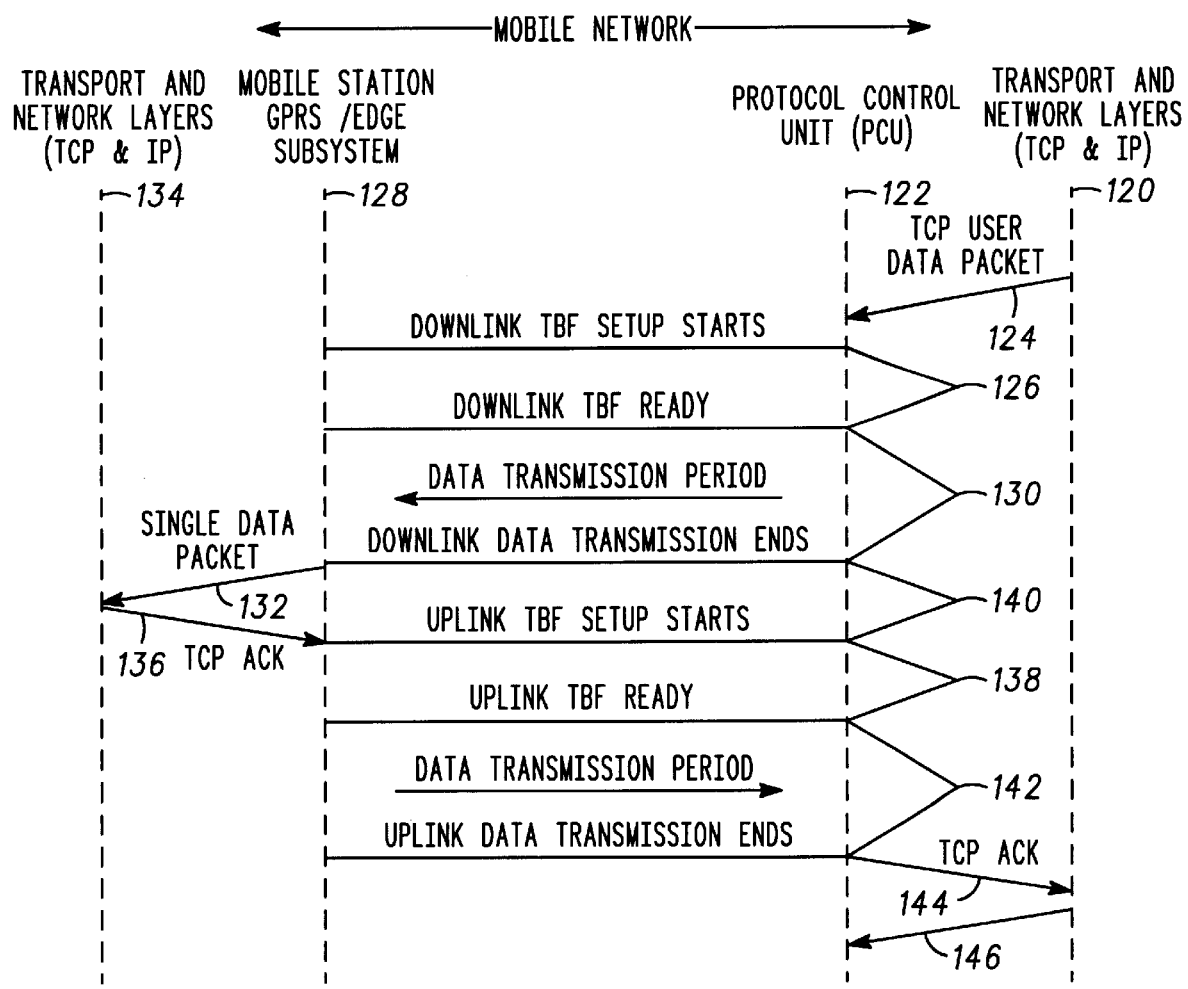
FIG. 2 is a data flow diagram of a stream-oriented data transmission from a remote host on a network to a mobile station.
Figure 3:
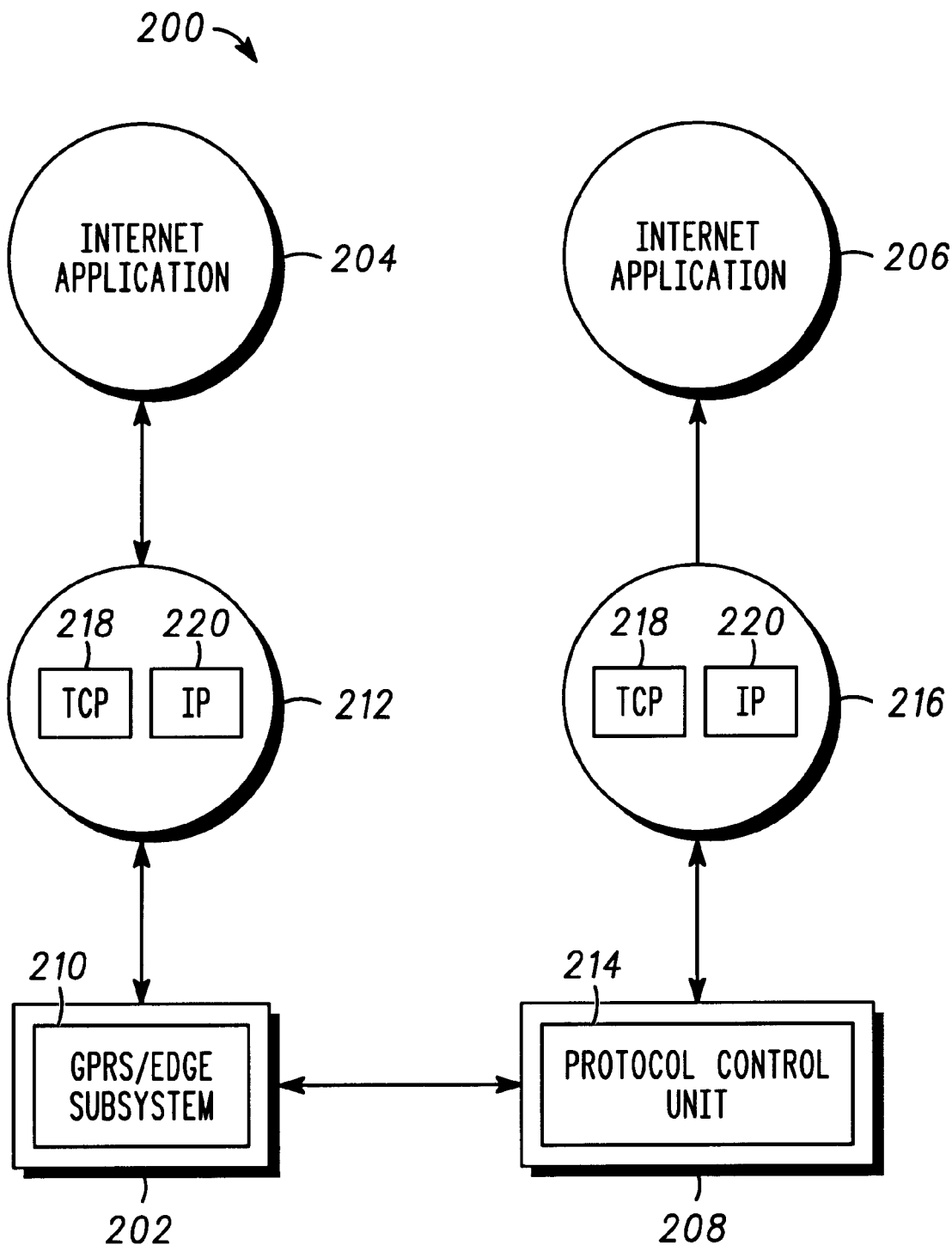
FIG. 3 is a schematic diagram of a GPRS system according to the present invention.

FIG. 3 is a schematic diagram of a GPRS system according to the present invention. As illustrated in FIG. 3, a GPRS system 200 includes a mobile station 202 sending and receiving packet data from an internet application 204 to a remote internet application 206 through a base station system 208. While a single base station system 208 and mobile station 202 is illustrated in FIG. 3, it is understood that GPRS system 200 includes multiple numbers of base station systems and mobile stations. Mobile station 202 includes a GPRS/EDGE subsystem 210 for processing signaling messages received from base station system 208, and signals received from internet application 204 through transport and network layers 212. GPRS/EDGE subsystem 210 adds header overhead for sub-network convergence/divergence protocol (SNDCP), and logical link control (LLC). A protocol control unit 214 is coupled to or contained within base station system 208, and interfaces with GPRS/EDGE subsystem 210 of mobile station 202, and with internet application 206 through transport and network layers 216. Internet transport layers 212 and 216 include a transmission control protocol (TCP) layer 218 which TCP packetizes stream-oriented user data, and an internet protocol (IP) layer 220 which assigns an address to the packetized data.

Figure 4:
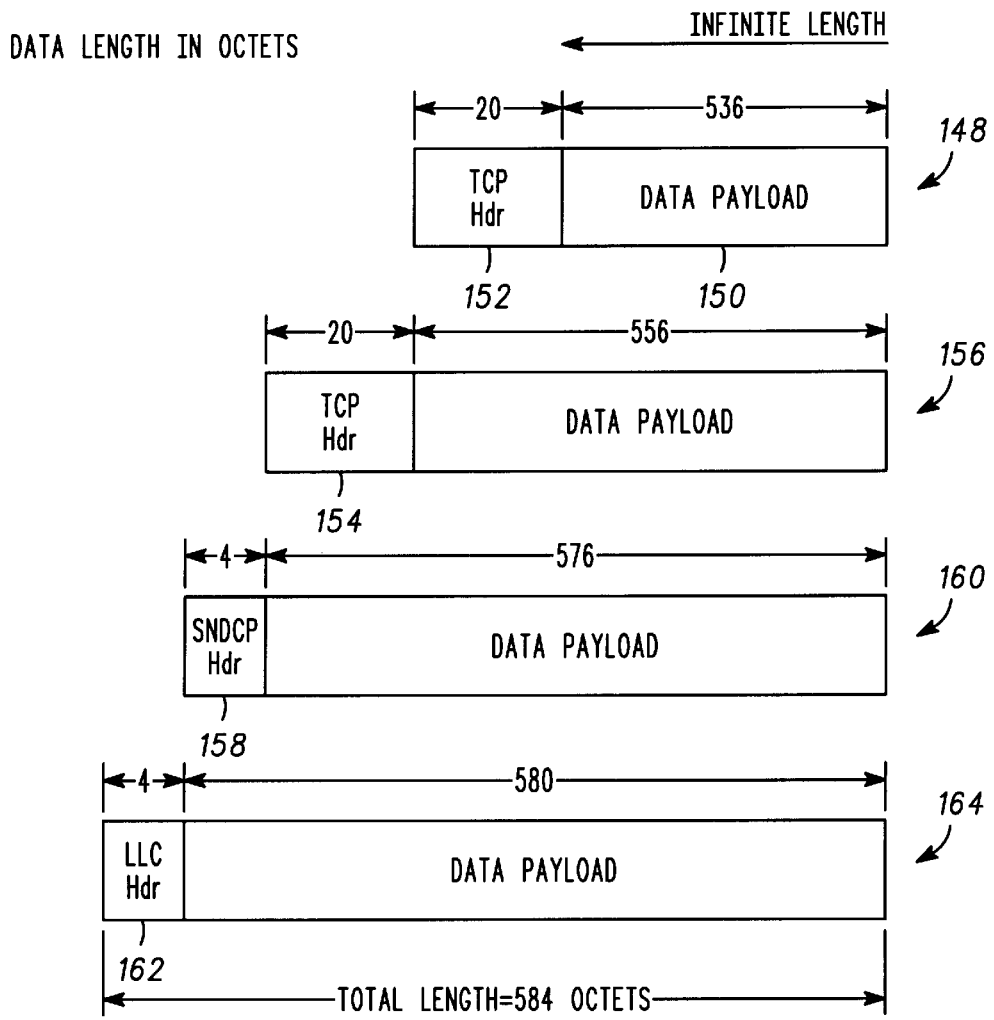
FIG. 4 is a schematic diagram of modification of a user data stream as the user data stream passes through specified layers of a GPRS system.

FIG. 4 is a schematic diagram of modification of a user data stream as the user data stream passes through specified layers of a GPRS system. As illustrated in FIG. 4, a user data stream of infinite length is modified as the user data stream passes through GPRS system 200. For example, as illustrated in FIGS. 3 and 4, as the user data stream passes through transmission control protocol layer 218, and an RLC layer, the data stream is divided into a TCP packet 148 that includes a payload 150 that is 536 octets in length and a transmission control protocol header packet 152 that is twenty octets in length, giving TCP packet 148 a total length of 556 octets. As TCP packet 148 subsequently passes through internet protocol layer 220, an additional twenty octet internet protocol header 154 is appended to TCP packet 148, forming an IP packet 156 having a total length of 576 octets. An additional four octet SNDCP header 158 is appended to IP packet 156, forming an SNDCP packet 160 having a total length of 580 octets, and an additional four octet logical link control header 162 is appended to SNDCP packet 160 forming a logical link control packet 164 having a total length of 584 octets. As a result, the user data stream has a total length of 584 octets as the data stream exits logical link control.

Next, radio link control divides the 584 octet logical link control packet 164 into a certain number of radio link control data blocks, the exact number of which depends upon the channel coding scheme used. For example, in a CS-1 channel coding scheme, the number of radio link control blocks needed is equal to (LLC frame length/RLC payload length)+(LLC frame length MOD RLC payload length), which for the 584 octet logical link control frame is equal to 31 radio link control blocks. In a CS-2 channel coding scheme, the number of radio link control blocks needed is equal to (LLC frame length/RLC payload length)+(LLC frame length MOD RLC payload length), which for the 584 octet logical link control frame is equal to 21 radio link control blocks.

Figure 5:
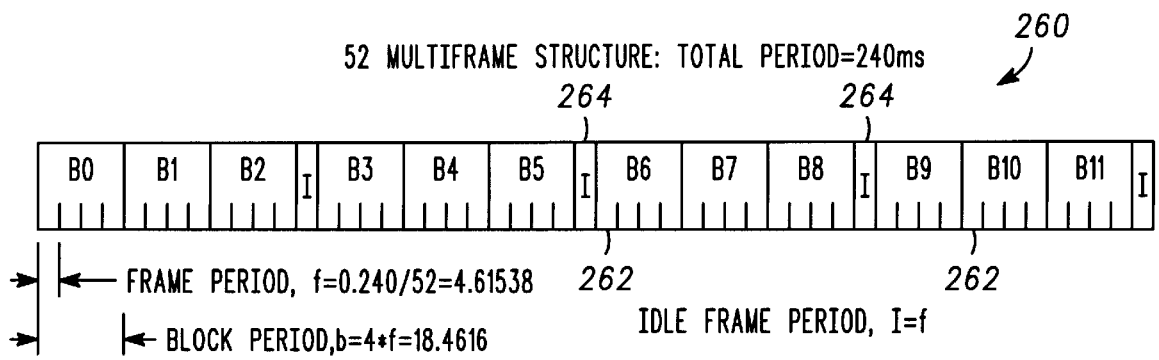
FIG. 5 is a schematic diagram of a multiframe structure for a data packet.

FIG. 5 is a schematic diagram of a multiframe structure for a data packet. Assuming a perfect schedule of one radio link control block transmitted on each available block period for a single timeslot transfer, raw throughput may be computed based upon the length of time required to send a certain number of radio link control data blocks. As illustrated in FIG. 5, a packet data control channel is organized as a multiframe 260 having fifty-two frames 262 and twelve data blocks B0–B11, in which each data block B0–B11 is distributed over four time division multiple access (TDMA) frames. An "idle" or "search" frame 264 located after every three data blocks, enables the mobile station to perform adjacent cell signal measurements, synchronization and verification of synchronization status on adjacent cells, interference measurements, and so forth. Each data block B0–B11 is made up of four frames, each of which has a frame period f equal to 4.61538 milliseconds, and a block period b that is equal to 18.4616 milliseconds, while each idle frame 264 has an idle frame period I that is equal to the frame period f, or 4.61538 milliseconds. The total period of the multiframe 260 structure of the packet data channel is equal to 240 milliseconds.

The length of time required $T_R$ to send a certain number of radio link control data blocks $N_b$ is calculated using the following equation:

$$T_r = (N_b \times b) + (N_b/3) \times f) \quad \text{EQUATION 1}$$

while the raw data throughput $R_d$ is calculated using the following equation:

$$R_d = (\text{number of payload octets}/T_R) \times 8 \quad \text{EQUATION 2}$$

Using Equations 1 and 2, the time required to send all of the radio link control blocks in a logical link control frame in a CS-1 coding scheme (i.e. 31 blocks) is equal to 0.618462 sec. The throughput is the number of payload octets (584) divided by the time required to send them plus their overhead (0.618462) times 8 bits per octet, which is equal to 7000 bits/second. In terms of an overhead analysis of the CS-1 coding scheme, theoretical throughput is approximately equal to 9050 bits/sec. The overhead of scheduling, i.e. the fact that there are idle frames that prevent the scheduling of every consecutive block reduces the effective throughput by 4/52 to approximately 8861 bits/second. The overhead of radio link control headers, i.e. three octets per block, reduces the effective throughput by 3/22 to approximately 7652 bits/second. The overhead of the logical link control header, four octets, reduces the effective throughput by 4/584 to approximately 7599 bits/second. Finally, the overhead of the SNDCP header, 4 octets, reduces the effective throughput by 4/580 to approximately , and the overhead of the Internet protocol suite, i.e. TCP and IP headers, reduces the effective throughput by 40/576 to approximately 7000 bits/second.

Similarly, the time required to send all of the radio link control blocks in a logical link control frame (i.e. 21 blocks) in a CS-2 coding scheme is equal to 0.42 second, and the throughput is the number of payload octets (584) divided by the time required to send them plus their overhead (0.42) times 8 bits per octet, which is equal to 10,209 bits/second. Theoretical throughput on channel at CS-2 is approximately equal to 13,400 bits/sec. The overhead of scheduling, i.e. the fact that there are idle frames that prevent the scheduling of every consecutive block reduces the effective throughput by 4/52 to approximately 12,369 bits/second. The overhead of radio link control headers, i.e. three octets per block, reduces the effective throughput by 3/32 to approximately 11,209 bits/second. The overhead of the logical link control header, four octets, reduces the effective throughput by 4/584 to approximately 11,132 bits/second. Finally, the overhead of the SNDCP header, four octets, reduces the effective throughput by 4/580 to approximately 11,055 bits/second, and the overhead of the Internet protocol suite, i.e. TCP and IP headers, reduces the effective throughput by 40/576 to approximately 10,209 bits/second.

Figure 6:
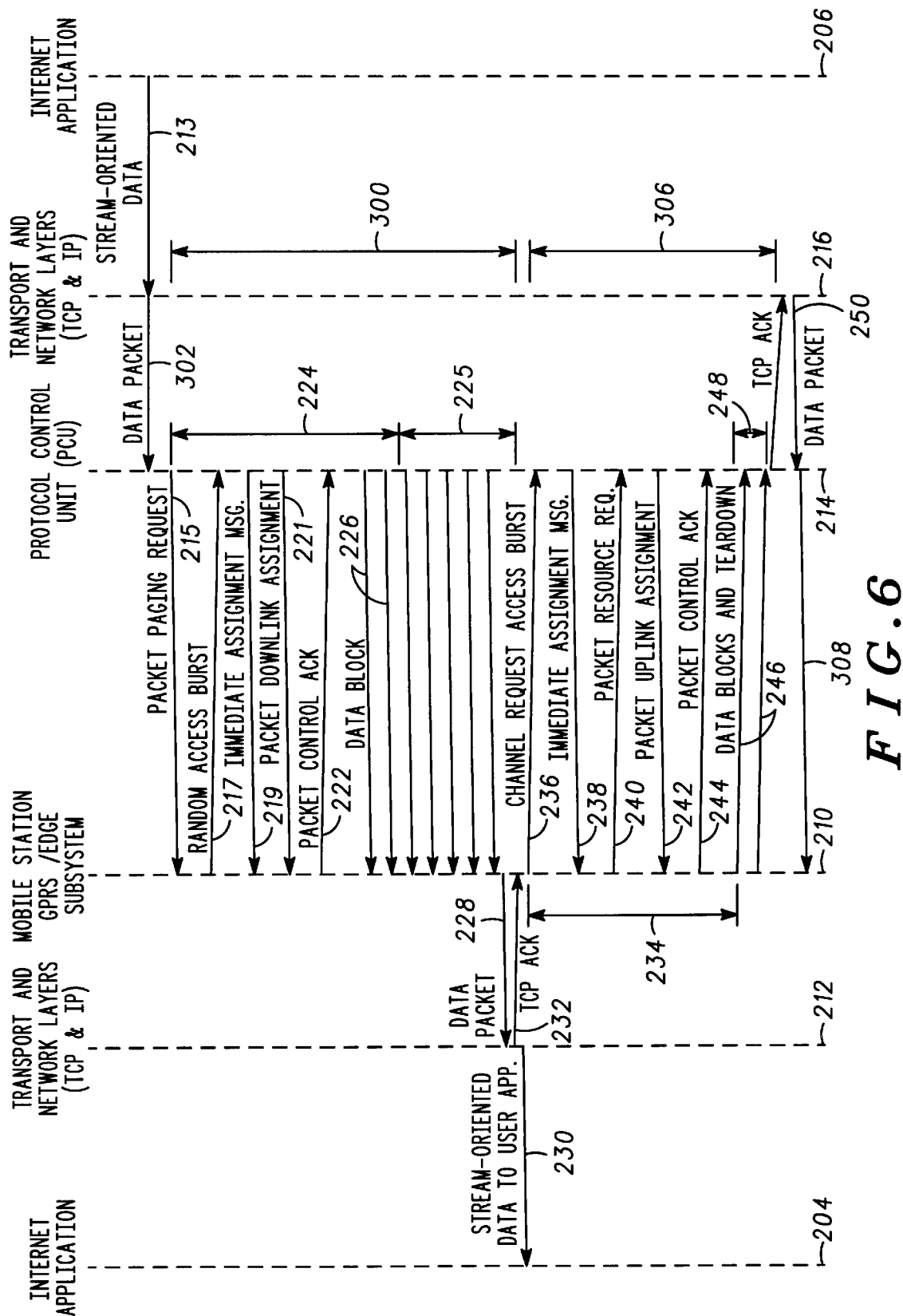
FIG. 6 is a data flow diagram of stream-oriented data transmitted between a mobile station and a network.

FIG. 6 is a data flow diagram of stream-oriented data transmitted between a mobile station and a network. As illustrated in FIGS. 3 and 6, when stream-oriented data 213 is transmitted from remote internet application 206 to mobile station 202 during a downlink period 300 for sending data long a downlink, the data is first divided into packets at TCP layer 218, and given an address at IP layer 220 of transport and network layer 216, and sent to protocol control unit 214 of base station system 208 as a TCP/IP packet 302.

As illustrated in FIGS. 4 and 6, during downlink period 300, TCP/IP packet 302 includes overhead associated with logical link control packet 238 and SNDCP packet 234, and it is assumed that for every TCP/IP packet 302, there is a corresponding logical link control packet 164 and SNDCP packet 160 as well. The actions associated with transmitting the information over the air interface begin when a logical link control frame containing the user information in the form of an encapsulated transport/network/SNDCP packet enters protocol control unit 214 of base station system 208.

As illustrated in FIGS. 3 and 6, assuming that mobile station 202 is camped on the network in packet idle mode, when appropriate, base station system 208 begins a setup sequence of a downlink setup period 224 by sending a package paging request 215 to GPRS/EDGE subsystem 210 of mobile station 202. In response, after receiving a random access burst 217 from GPRS/EDGE subsystem 210, protocol control unit 214 sends an immediate assignment message 219 and a packet downlink message 221, detailing the parameters of the assignment, e.g. over what channel the transfer would take place, when the transfer would start, and so on. Protocol control unit 214 sends a series of radio link control data blocks 226 to GPRS/EDGE subsystem 210 after receiving a packet control acknowledge message 222 from GPRS/EDGE subsystem 210.

Depending upon the availability of schedulable blocks, packet paging request message 215 may require from 81 to 1721 ms, followed by random access burst 217 from mobile station 102, which typically requires 9.6 ms. Immediate assignment message 219 contains a starting time that may range from 37 ms to 3 minutes in the future, but typically ranges from 13 to 25 TDMA frame periods, or 60–115 ms. Additional signaling associated with exchanging packet downlink assignment message 221 and a packet control acknowledgement message 222 are included in downlink setup period 224. It is therefore assumed that downlink setup period 224 may be equal to a starting time, which is in fact what is observable in an actual system. As a result, the time required for downlink setup period 224 is a minimum of approximately 849 ms, a maximum of approximately 2643 ms and an average of approximately 1746 ms.

After the starting time has been reached, protocol control unit 218 sends GPRS/EDGE subsystem 210 a temporary block flow containing radio link control data blocks 226. Once GPRS/EDGE subsystem 210 has received all downlink blocks, GPRS/EDGE subsystem 210 assembles, processes and transmits a resulting single data packet 228 to IP layer 220 of transport and network layers 212, which then sends data packet 228 to TCP layer 218 of transport and network layers 212.

Assuming perfectly available radio resources so that data may be sent on every schedulable downlink block on a single timeslot, the time to transmit all blocks during data transfer period 225 for a 536 octet user data payload is approximately equal to 0.618462 seconds for a CS-1 coding scheme, and 0.420 seconds for a CS-2 coding scheme. The downlink temporary block flow terminates after a last radio link control data block is sent if sending radio link control on protocol control unit 214 has no more data to be sent and a radio link controller timer T3192 expires before radio link control receives more data to be sent from logical link control, which is the case when a transmission control protocol transmission starts in "congestion control" (slow-start) mode. The temporary block flow is always torn down after the blocks making up the first transmission control protocol packet are transmitted, causing the downlink temporary block flow to incur the overhead of temporary block flow being setup again for the subsequent blocks.

TCP layer 218 of transport and network layers 212 performs redundancy checking and makes a determination that data packet 228 has been received properly. IP layer 220 of transport and network layers 212 then includes the packet data in a stream-oriented output 230 to internet application 204 and issues a TCP acknowledgement (TCP ACK) message 232 to TCP layer 218 of transport and network layers 216 on the far end of the virtual circuit. TCP ACK message 232 is processed by SNDCP/LLC and RLC layers as before, but in an uplink direction.

Radio link controller of GPRS/EDGE subsystem 210 of remote transport and network layers 216 receives a TCP/IP/SNDCP/LLC packet containing TCP ACK message 232, but cannot begin a setup sequence corresponding to an uplink setup period 234 for transmission of TCP ACK message 232 until a radio link control timer T3192 of protocol control unit 114 has expired. As a result, a downlink temporary block flow corresponding to downlink period 300 that carries TCP/IP packet 302 that was initially sent, must be torn down completely before uplink period 234 for setting up TCP ACK message 232 may begin.

For example, upon receiving TCP ACK message 232, GPRS/EDGE subsystem 210 sends a channel request access burst 236 to protocol control unit 214, which responds by sending an immediate assignment message 238. GPRS/EDGE subsystem 210 then sends a packet resource request message 240 to protocol control unit 214 requesting resources for a temporary block flow. Protocol control unit 214 responds with a packet uplink assignment message 242, which is acknowledged by GPRS/EDGE subsystem 210 in a packet control acknowledge message 244. Data blocks 246 containing TCP ACK message 232 and teardown are then transmitted from GPRS/EDGE subsystem 210 to protocol control unit 214 during an acknowledge data transfer period 248. Protocol control unit 214 then transmits data blocks 246 to transport and network layers 216 in a TCP acknowledge message 304. As a result, uplink setup period 234 and acknowledge data transfer period 248 form an uplink period 306 that is required for TCP acknowledge message 232 to reach transport and network layer 216 in corresponding TCP acknowledge message 304. Once the required TCP ACK message is received by transport and network layers 216, a next TCP/IP data packet message 250 is sent from transport and network layers 216 to GPRS/EDGE subsystem 210 via protocol control unit 214.

The period required for the initial setup of uplink setup period 234 is dependent upon components such as the periodic occurrence of a random access channel (RACH), the starting time sent in immediate assignment message 238, and the starting time sent in packet uplink assignment message 242. The periodic occurrence of a random access channel can range from 41–217 TDMA frame periods, assuming a case of 41 frame periods, or 190 ms. The starting time sent in immediate assignment message 238 may range from 9 TDMA frame periods to 3 minutes, but is typically from 9–25 TDMA frame periods, or 42–115 ms, while the starting time sent in packet uplink assignment message 242 may range from 9 TDMA frame periods to 3 minutes, but is typically around 20 TDMA periods, or 92 ms. As a result, initial setup of uplink setup period 234 is typically a minimum of approximately 320 ms, a maximum of approximately 480 ms, and an average of approximately 320 ms.

TCP ACK message 232 has a length of 40 octets, which combined with the overhead of both logical link control header 162 and SNDCP header 158 is equal to 48 octets. Assuming perfectly available radio resources so that data may be sent on every schedulable downlink block on a single timeslot, the time to transmit all data blocks 246 during acknowledge data transfer period 248 for a 40 octet TCP/IP ACK payload is equal to 60 ms (3 RLC data blocks) for the CS-1 coding scheme, and 37 ms (2 RLC data blocks) for the CS-2 coding scheme.

According to the present invention, once protocol control unit 214 receives packet resource request message 240 requesting a temporary block flow in an opposite direction relative to TCP/IP data packet 302, protocol control unit 214 determines the resulting number of data blocks 246 transmitted by GPRS/EDGE subsystem 210. A heuristic is then defined, based on the determined number of data blocks 246, so that during each subsequent TCP/IP data packet message 250, a determination is made as to whether mobile station 202 is using the temporary block flow requested in packet resource request message 240 to transmit TCP acknowledgement message 232 corresponding to TCP/IP data packet message 250, and therefore requires a virtual acknowledgement channel. For example, according to the present invention, if the heuristic is less than a predetermined value, a determination is made that GPRS/EDGE is requesting an acknowledgement channel during a next uplink setup period 234 corresponding to subsequent TCP/IP data packet message 250.

If it is determined that mobile station 202 is requesting an acknowledgement channel, protocol control unit according to the present invention would have the option (depending upon congestion at the radio level) of keeping the temporary block flow associated with TCP ACK message 232 alive and periodically allocating a necessary number of uplink radio blocks for TCP acknowledgement message 232 associated with subsequent TCP data package messages 250 to be sent by GPRS/EDGE subsystem 210. According to the present invention, as illustrated in FIG. 6, allocation of radio resources by protocol control unit 214 is performed in either a fixed or a dynamic mode by sending an allocation message 308 to GPRS/EDGE subsystem 210 from protocol control unit 214. For example, in a fixed allocation mode, allocation message 308 includes an allocation bitmap having one or more timeslots allocated, depending on the size of the transfer and the availability of radio resources, and in a dynamic allocation mode, allocation message 308 grants the right for mobile station 202 to transmit in a next block period using an uplink state flag (USF) setting. As a result, according to the present invention, existing multiple access capabilities of a MAC are preserved, since many mobile stations could be serviced on the same timeslot.

Figure 7:
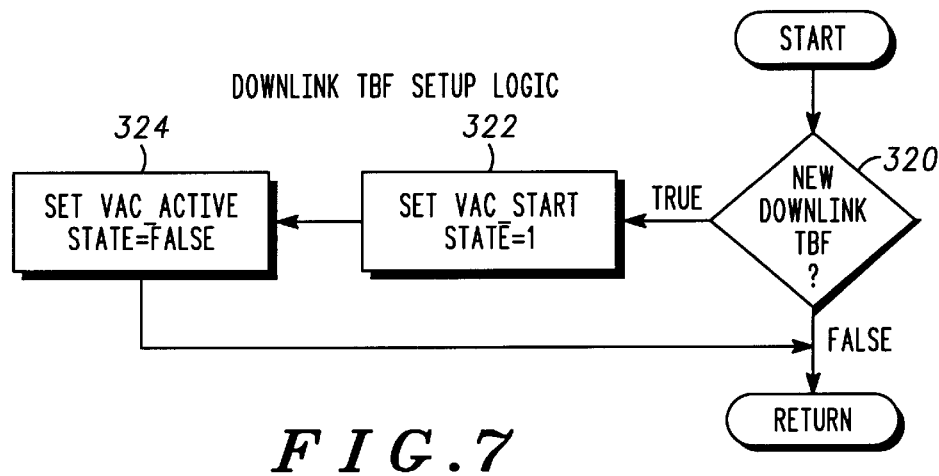
FIG. 7 is a flowchart of a downlink temporary block flow setup according to the present invention.

FIG. 7 is a flowchart of a downlink temporary block flow setup according to the present invention. As illustrated in FIGS. 6 and 7, after packet paging request 215, once random access burst 217 is received by protocol control unit 214, and before data blocks 226 are transmitted in data packet message 228, a determination is made by protocol control unit 214 in Step 320 as to whether a new downlink temporary block flow is being set up. If a new downlink temporary block flow is being set up, protocol control unit 214 sets a virtual acknowledgement channel start state equal to one, Step 322, and a virtual acknowledgement channel active state equal to FALSE, Step 324, and the process returns to Step 320 for a next temporary block flow request.

Figure 8:
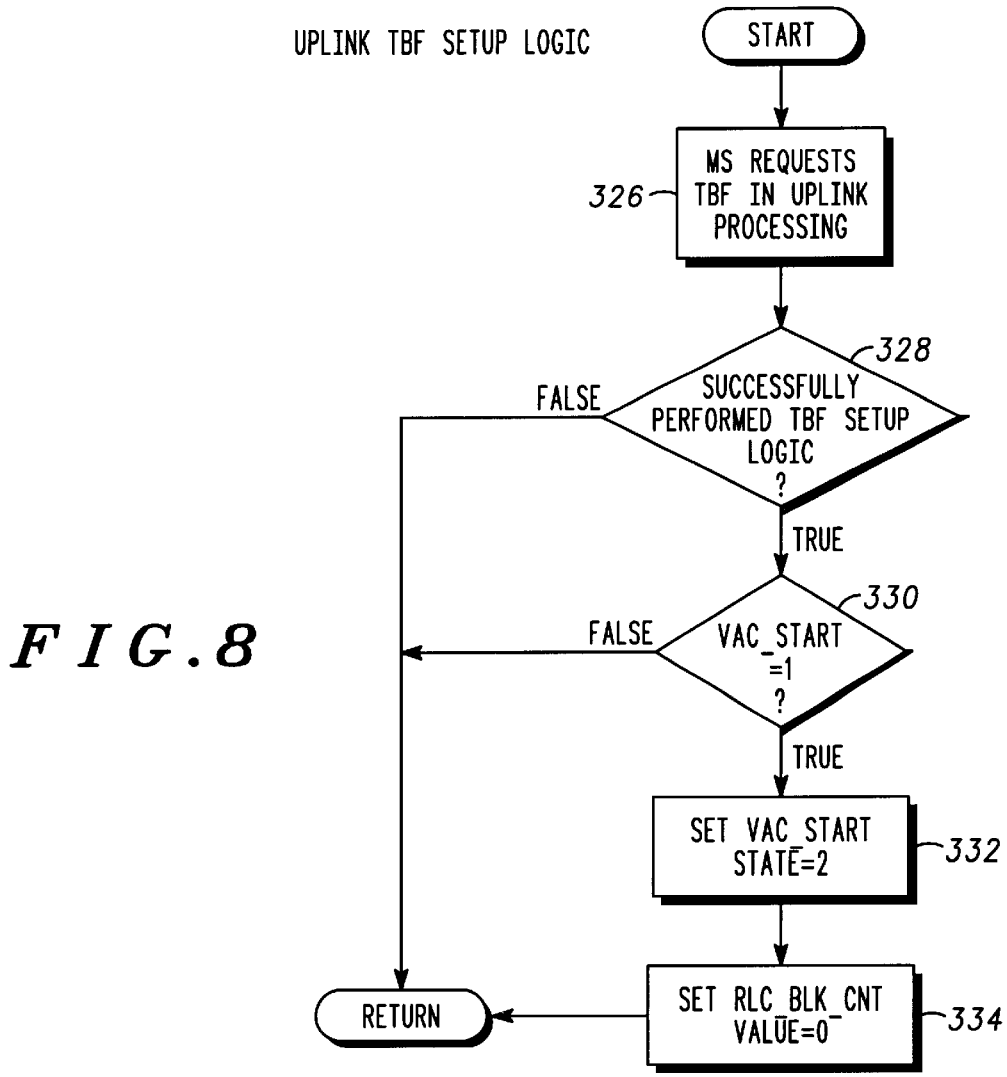
FIG. 8 is a flowchart of an uplink temporary block flow setup according to the present invention.

FIG. 8 is a flowchart of an uplink temporary block flow setup according to the present invention. As illustrated in FIGS. 6 and 8, once mobile station 202 requests temporary block flow in packet resource request message 240 of uplink setup period 234, Step 326, and after packet control acknowledge message 244 from GPRS/EDGE subsystem 210 is initially received by protocol control unit 214, a determination is made as to whether the temporary block flow setup was performed successfully, Step 328. If the temporary block flow setup was not successfully performed, the process returns Step 326 to a next temporary block flow request in a subsequent packet resource request message 240. If the temporary block flow setup was successful, a determination is made as to whether the virtual acknowledgement channel start state is equal to one, Step 330.

If the virtual acknowledgement channel start state is not equal to one, the process returns to Step 326. However, if the virtual acknowledgement channel start state is equal to one, the virtual acknowledgement channel start state is equal to two, Step 332, a radio link control block count value is set equal to zero, Step 334, and the process returns to Step 326.

Figure 9:
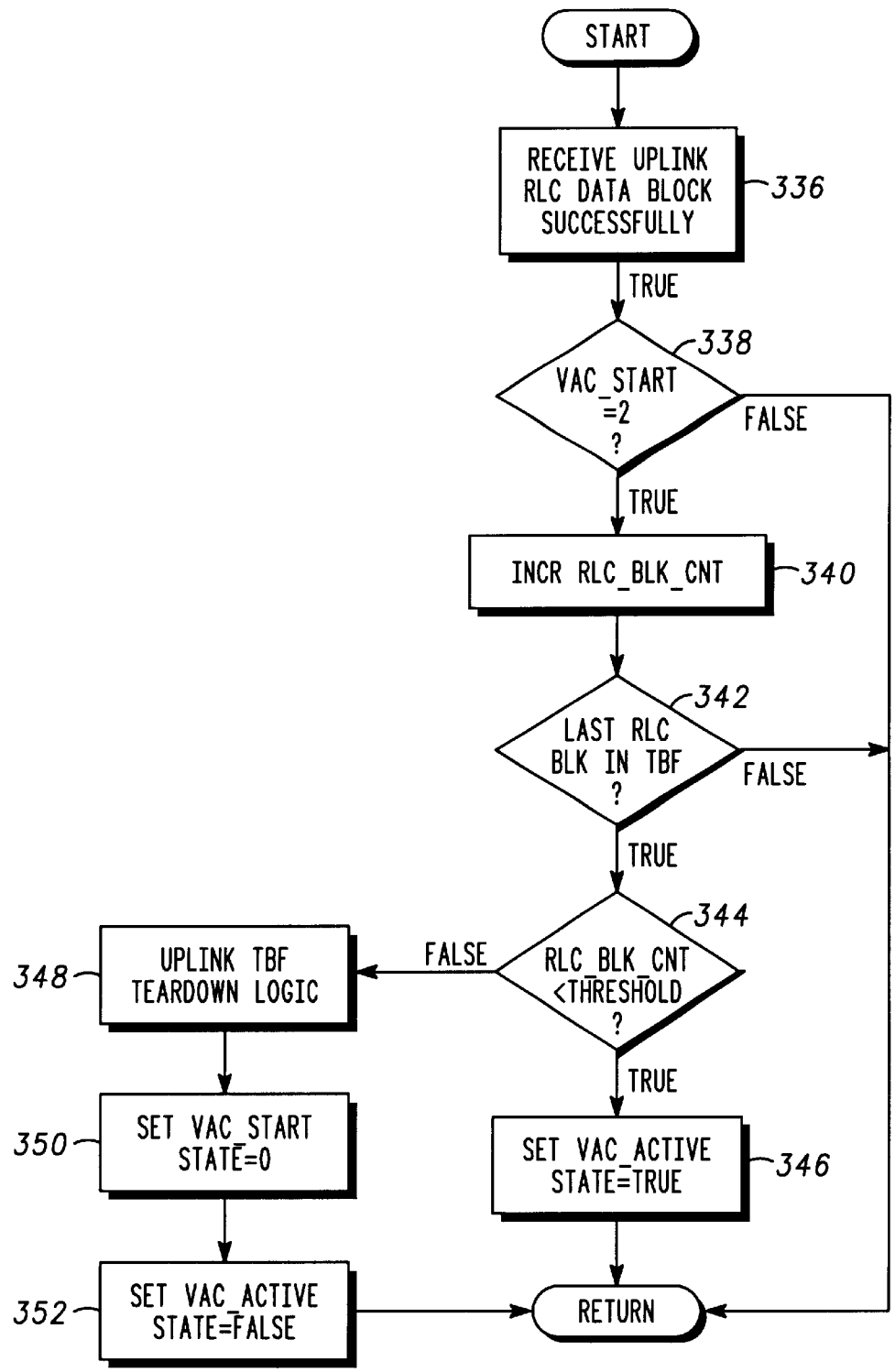
FIG. 9 is a flowchart of receipt of an uplink radio link control data block corresponding to an uplink period, according to the present invention.

FIG. 9 is a flowchart of receipt of an uplink radio link control data block corresponding to an uplink period, according to the present invention. As illustrated in FIGS. 6 and 9, according to the present invention, once uplink data blocks 246 from GPRS/EDGE subsystem 210 are received successfully by protocol control unit 214, Step 336, protocol control unit 214 makes a determination as to whether the virtual acknowledgement channel start state is equal to two, Step 338. If the virtual acknowledgement channel start state is not equal to two, the process returns to step 336. If the virtual acknowledgement channel start state is equal to two, the radio link control block count is incremented, Step 340, and a determination is then made as to whether the all radio link control blocks 246 have been received, Step 342. If all radio link control blocks 246 have not been received, the process returns to Step 338. Once all radio link control blocks 246 have been received, a determination is made as to whether the radio link control block count is less than a predetermined threshold value, Step 344.

If the radio link control block count is less than the predetermined threshold, the virtual acknowledgement channel is activated by setting active state equal to TRUE, Step 346, and the process returns to Step 336. If the radio link control block count is not less than the predetermined threshold, the uplink temporary block flow teardown is initiated, Step 348, the virtual acknowledgement channel start state is set equal to zero, Step 350, the virtual acknowledgement channel active state is set equal to FALSE, Step 353, and the process returns to Step 336 for a next received uplink stream oriented data 213.

Figure 10:
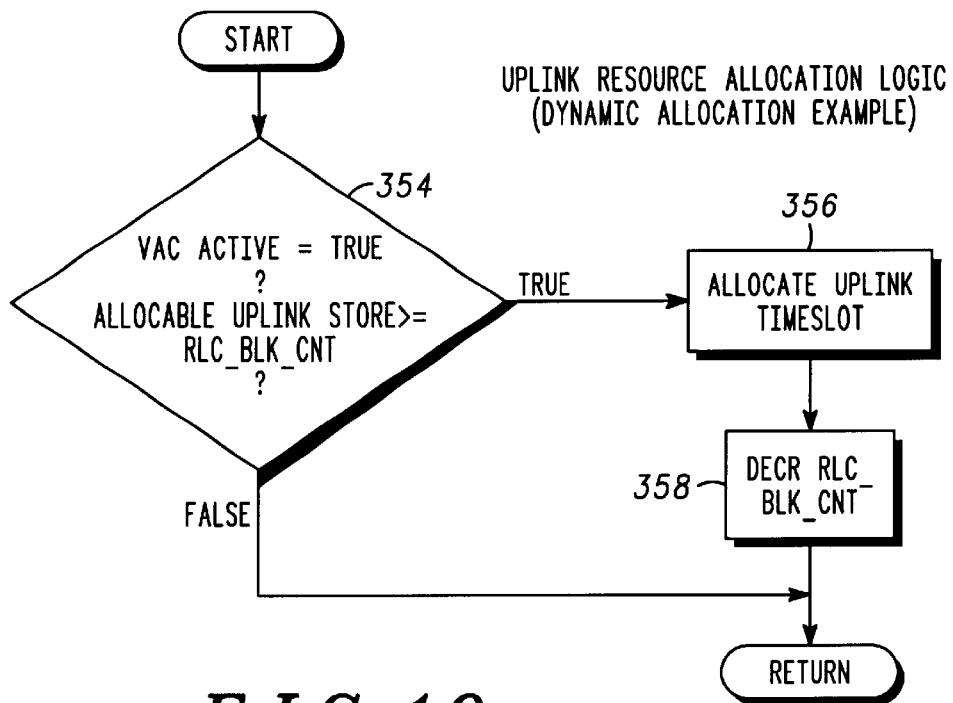
FIG. 10 is a flowchart of allocation of an uplink timeslot in a dynamic allocation mode according to the present invention.

FIG. 10 is a flowchart of allocation of an uplink timeslot in a dynamic allocation mode according to the present invention. As illustrated in FIGS. 6 and 10, after TCP/IP data packet message 250 is received, protocol control unit 214 makes a determination as to whether virtual acknowledgement channel active state is equal to TRUE and as to whether enough allocable uplink slots are available to transmit the total number of radio link control blocks corresponding to TCP acknowledgement message 232. If the virtual acknowledgement active state is activated and there is enough available uplink slots, protocol control unit allocates the uplink timeslots by sending allocation message 308 to GPRS/EDGE subsystem 210, Step 356, and the radio link control block count is decremented, Step 358, and the process returns to Step 354.

Figure 11:
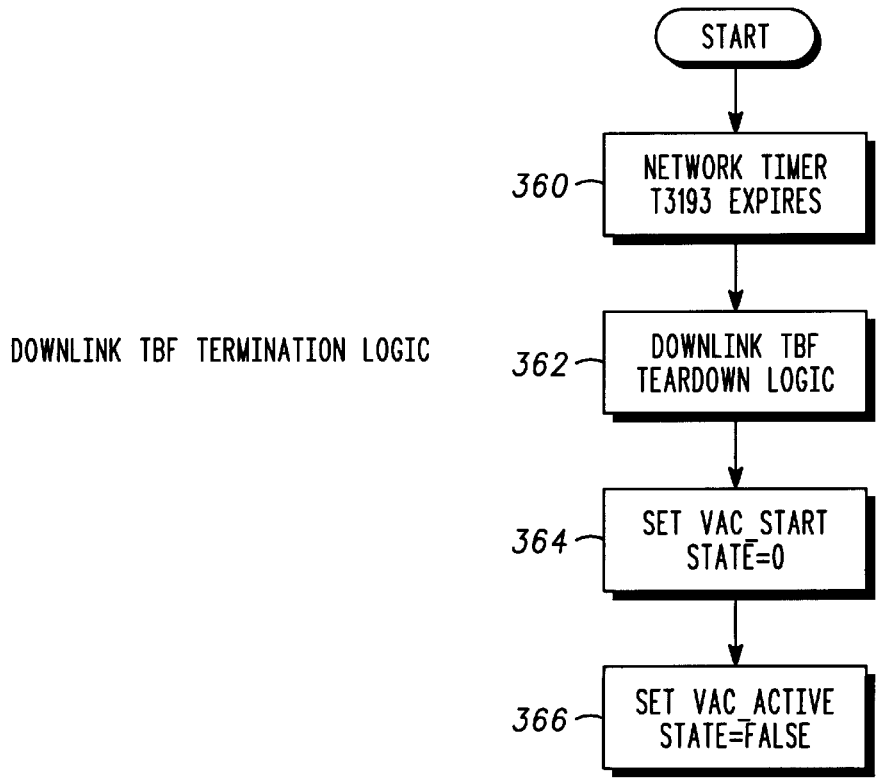
FIG. 11 is a flowchart of termination of a downlink temporary flow block, according to the present invention.

FIG. 11 is a flowchart of termination of a downlink temporary flow block, according to the present invention. As illustrated in FIGS. 6 and 11, downlink temporary block flow terminates, Step 362 after a last radio link control data block of data blocks 226 is sent if sending radio link control on protocol control unit 214 has no more data to be sent and a radio link controller timer T3192 expires, Step 360 before radio link control receives more data to be sent from logical link control. Once teardown begins, virtual acknowledgement channel start state is et equal to zero, Step 364 and virtual acknowledgement channel active state is set equal to False, Step 366.

In this way, the virtual acknowledgement channel according to the present invention causes an initial temporary block flow setup in the usual manner, incurring the present amount of initial overhead, and when the network detects the mobile station requesting a temporary block flow in the opposite direction, it grants the request in the usual manner, but measures the number of radio link control data blocks transmitted by the mobile station. A heuristic is defined, based on the number of radio link control blocks, to describe how the network determines that the mobile station is desiring to use the temporary block flow in the opposite direction for transport layer acknowledgement. For example, according to the present invention a heuristic may be implemented by requiring the network to count the number of radio link control data blocks sent by the mobile station before sending its teardown (countdown) sequence. During subsequent data transmissions, a determination is made as to whether an acknowledgement message is being sent by comparing the subsequent requested number of data blocks requested with the heuristic. If the subsequently requested number of data blocks is less than the heuristic, it is statistically likely that the mobile station needs an acknowledgement channel.

If the above procedure indicates that the mobile station requires a virtual acknowledgement channel, then the network would have the option (depending on congestion at the radio level) of simply keeping the temporary block flow alive and periodically allocating enough uplink radio blocks to the mobile station for an acknowledgement to be sent. The allocation of radio resources would be performed by the usual means in either fixed or dynamic allocation mode, such that in fixed allocation mode, an allocation bitmap could be sent to the mobile station having a sparse number of timeslots allocated, and in dynamic allocation mode, the network could grant the right for the mobile station to transmit for a certain number of block periods by its uplink state flag (USF) set-ting. In this way, the multiple-access capabilities of the MAC are be preserved, as the network could service many mobile stations on the same timeslot.

According to the present invention, the rules for terminating the existence of the virtual acknowledgement channel would be defined, as well as the rules for converting a virtual acknowledgement channel into a normal temporary block flow, e.g. when the transport layer acknowledgement cycle is over, as evidenced by the transmission by the mobile station of a number of data blocks that exceed a certain predetermined number before sending its tear-down sequence, then the network may terminate the temporary block flow using known procedures. This would be the case when transport layer data interchange stops in one direction and then resumes in the other direction. According to the present invention, GSM specifications are modified in such a manner so as to allow for the creation, management and disposal of the VAC in as flexible terms as possible, allowing for the concept to be expressed broadly. This would allow for optimizations to be made available, peculiar to the operators own individual network usage and congestion patterns.

Figure 12:
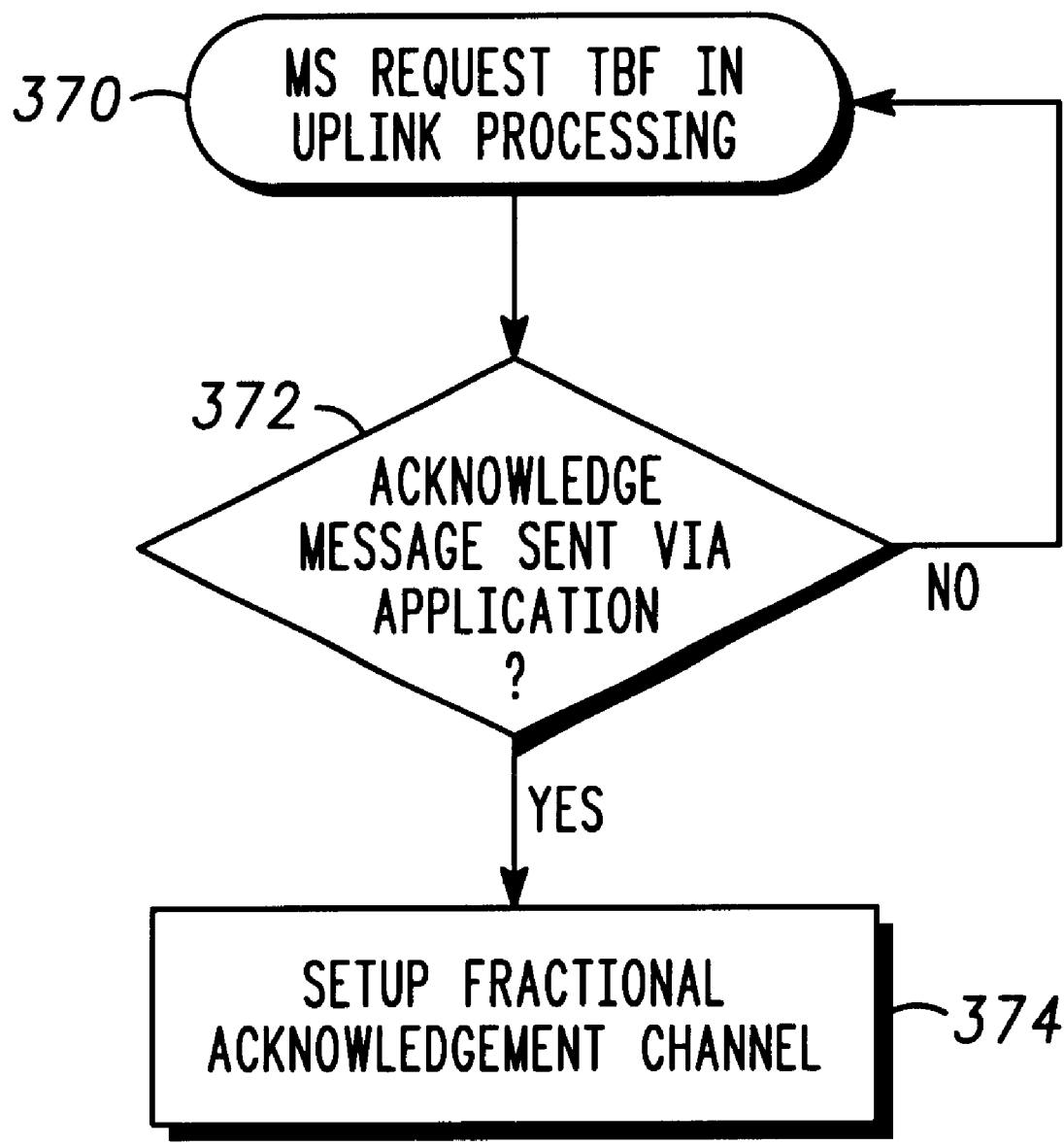
FIG. 12 is a flowchart for sending an acknowledgement message according to an alternate embodiment of the present invention.

FIG. 12 is a flowchart for sending an acknowledgement message according to an alternate embodiment of the present invention. As illustrated in FIGS. 6 and 12, rather than using a heuristic to make the determination of whether mobile station 202 is using the temporary block flow requested in packet resource message 240 to transmit TCP acknowledgement message 232 corresponding to next TCP data package message 250, and therefore requires a virtual acknowledgement message, a fractional acknowledgement channel is set up by base station system 208. During transmission of initial TCP acknowledgement message 232, in addition to requesting the temporary block flow during uplink setup period 234, mobile station 202 informs base station system 208 that a subsequent TCP acknowledgement message 232 is to be sent via the application. As a result, according to the present invention, after mobile station 202 requests a temporary block flow in uplink processing 234, Step 370, base station system 208 makes a determination as to whether the acknowledge message is to be sent via the application, Step 372. If the acknowledge message is to be sent via the application, base station system 208 sets up a fractional acknowledgement channel, Step 374, which may be regular and periodic. For example, base station system 208 sets up certain blocks of every 52 multiframe, such as frames B1 and B2, (FIG. 5) as an acknowledgement channel for transmitting TCP acknowledgement message 232 during subsequent transfers.

While a particular embodiment of the present invention has been shown and described, modifications may be made. For example, although described above in terms of sending acknowledged transport data on the downlink, the virtual acknowledgement channel of the present invention can also be applied in an uplink direction. It is therefore intended in the appended claims to cover all such changes and modifications which fall within the true spirit and scope of the invention.

What is claimed is:

1. A method for sending acknowledged transport data in a GPRS system, comprising the steps of:
    counting the number of data blocks in an acknowledgement message corresponding to an initial data packet transmission;
    defining a heuristic based on the number of data blocks counted;
    comparing the number of corresponding data blocks corresponding to a subsequent data packet transmission with the heuristic; and
    determining that a virtual acknowledgement channel is being requested in response to the number of corresponding data blocks in the subsequent data packet transmission being less than the heuristic.

2. A communication system for transmitting data, the communication system comprising:
    a mobile station requesting transmission in a direction opposite to an initial transmission; and
    a base station determining whether an acknowledgement transport layer protocol is being requested by the mobile station during transmission subsequent to the initial transmission, and creating a logical channel to support flow of acknowledgement information in the direction opposite to the initial transmission, wherein the base station defines a heuristic based upon the number of data blocks associated with the transmission request from the mobile station.

3. The communication system of claim 2, wherein the base station further determines during each subsequent transmission that the mobile station is requesting an acknowledgement channel in subsequent transmissions.

4. The communication system of claim 3, wherein the base station retains a temporary block flow associated with the subsequent transmission and periodically allocates uplink radio blocks corresponding to an acknowledgement message associated with subsequent transmissions by the mobile station.

5. The communication system of claim 4, wherein the base station allocates radio resources corresponding to the acknowledgement channel by including an allocation bitmap having one or more timeslots allocated.

6. The communication system of claim 4, wherein the base station allocates radio resources corresponding to the acknowledgement channel by granting rights for the mobile station to transmit in a next block period using an uplink state flag setting.

7. The communication system of claim 2, wherein the communication system is a GPRS/EDGE system.

8. A communication system for transmitting data, the communication system comprising:
    a mobile station receiving an initial transmission and requesting transmission in a direction opposite to the initial transmission; and
    a base station determining whether an acknowledgement transport layer protocol is being requested by the mobile station during transmission subsequent to the initial transmission, and creating a logical channel to support flow of acknowledgement information in the direction opposite to the initial transmission if an acknowledgement transport layer is being requested, wherein the base station initiates a fractional acknowledgement channel in response to the mobile station indicating, during an initial acknowledgement message associated with the initial transmission, that a subsequent acknowledgement message is to be sent.

9. A method for supporting data transmission between a mobile station and a base station comprising the steps of:
    determining whether an acknowledgement transport layer protocol is being requested by the mobile station subsequent to an initial transmission from the base station, including defining a heuristic based upon amount of information associated with the transmission request from the mobile station; and
    creating, in response to determining that an acknowledgement transport layer protocol is being requested, a logical channel to support flow of acknowledgement information in the direction opposite to the initial transmission.

10. The method of claim 9, wherein the step of determining whether an acknowledgement transport layer protocol is being requested includes the steps of:
    defining the amount of information based upon the number of data blocks associated with the transmission request from the mobile station;
    comparing the number of data blocks associated with subsequent transmissions from the mobile station with the heuristic; and
    determining, in response to the number of data blocks associated with a subsequent transmission from the mobile station being less than the heuristic, that an acknowledgement transport layer protocol is being requested.

11. The method of claim 10, wherein the step of creating a logical channel to support flow of acknowledgement information in the direction opposite to the initial transmission comprises the steps of:

retaining a temporary block flow associated with the subsequent transmission; and allocating uplink radio blocks corresponding to an acknowledgement message associated with a subsequent transmission by the mobile station.

12. The method of claim 11, wherein the step of allocating includes inserting an allocation bitmap having one or more timeslots allocated for transmission of the acknowledgement message.

13. The method of claim 11, wherein the step of allocating includes granting rights for the mobile station to transmit in a next block period using an uplink state flag setting.

14. A method for supporting data transmission between a mobile station and a base station comprising the steps of:

determining whether an acknowledgement transport layer protocol is being requested by the mobile station subsequent to an initial transmission from the base station; and creating, in response to determining that an acknowledgement transport layer protocol is being requested, a logical channel to support flow of acknowledgement information in the direction opposite to the initial transmission, wherein the step of creating includes initiating a fractional acknowledgement channel in response to determining an acknowledgement transport layer protocol is being requested, and that a subsequent acknowledgement message is to be sent responsive to a subsequent transmission from the base station.

15. A method for implementing an acknowledgement cycle in a packet-switched transport layer, comprising the steps of:

determining, prior to transmitting data blocks in a data package message, whether a new downlink temporary block flow is being set up;

determining, in response to determining that a new downlink temporary block flow is being set up, whether all radio link control blocks corresponding to a subsequent uplink period have been received;

determining whether a radio link control block count corresponding to the subsequent uplink period is less than a predetermined threshold; and activating a virtual acknowledgement channel in response to the radio link control block being less than the predetermined threshold.

16. The method of claim 15, wherein the step of activating comprises the steps of:

retaining a temporary block flow associated with the subsequent uplink period; and allocating uplink radio blocks corresponding to an acknowledgement message associated with a subsequent uplink period.

17. The method of claim 16, wherein the step of allocating includes inserting an allocation bitmap having one or more timeslots allocated for transmission of the acknowledgement message.

18. the method of claim 16, wherein the step of allocating includes granting rights for the mobile station to transmit in a next block period using an uplink state flag setting.

19. The method of claim 15, wherein the step of activating includes initiating a fractional acknowledgement channel in response to the radio link control block being less than the predetermined threshold.

20. A communication system for transmitting data, the communication system comprising:

a mobile station receiving an initial transmission;

the mobile station requesting transmission of an acknowledgement transport layer protocol in a direction opposite to the initial transmission; and a base station determining whether an acknowledgement transport layer protocol is being requested by the mobile station during transmission subsequent to the initial transmission, and creating a logical channel to support flow of acknowledgement information in the direction opposite to the initial transmission, wherein the base station defines a heuristic based upon the amount of information associated with the transmission request from the mobile station.

21. The communication system of claim 20, wherein the base station determines during each subsequent transmission that the mobile station is requesting an acknowledgement channel in subsequent transmissions.

22. The communication system of claim 21, wherein the base station retains a temporary block flow associated with the subsequent transmission and periodically allocates uplink radio blocks corresponding to an acknowledgement message associated with subsequent transmissions by the mobile station.

23. The communication system of claim 22, wherein the base station allocates radio resources corresponding to the acknowledgement channel by including an allocation bitmap having one or more timeslots allocated.

24. The communication system of claim 23, wherein the base station allocates radio resources corresponding to the acknowledgement channel by granting rights for the mobile station to transmit in a next block period using an uplink state flag setting.

25. The communication system of claim 21, wherein the base station initiates a fractional acknowledgement channel in response to the mobile station indicating, during an initial acknowledgement message associated with the initial transmission, that a subsequent acknowledgement message is to be sent.

26. The communication system of claim 21, wherein the communication system is a GPRS/EDGE system.

* * * * *